United States Patent
Inose et al.

(10) Patent No.: US 12,194,565 B2
(45) Date of Patent: Jan. 14, 2025

(54) CRACK REPAIR METHOD (71) Applicant: IHI CORPORATION, Tokyo (JP)

(72) Inventors: Koutarou Inose, Tokyo (JP); Naoyuki Matsumoto, Tokyo (JP); Shota Nakanishi, Tokyo (JP); Daiki Okita, Tokyo (JP); Junko Yamada, Tokyo (JP)

(73) Assignee: IHI CORPORATION, Tokyo (JP)

( * ) Notice: Subject to any disclaimer, the term of this patent is extended or adjusted under 35 U.S.C. 154(b) by 799 days.

(21) Appl. No.: 17/443,193

(22) Filed: Jul. 22, 2021

(65) Prior Publication Data

US 2021/0346987 A1 Nov. 11, 2021

Related U.S. Application Data (63) Continuation of application No. PCT/JP2020/003489, filed on Jan. 30, 2020.

(30) Foreign Application Priority Data

Feb. 1, 2019 (JP) .................. 2019-017412

(51) Int. Cl.
*B23K 26/34* (2014.01)
*B23K 26/354* (2014.01)

(52) U.S. Cl.
CPC ............ *B23K 26/34* (2013.01); *B23K 26/354* (2015.10)

(58) Field of Classification Search
None
See application file for complete search history.

(56) References Cited

U.S. PATENT DOCUMENTS

| 6,049,060 A | 4/2000 | Smashey et al. |
| 2002/0166844 A1* | 11/2002 | Kelly ...................... B23P 6/007 |
| | | 219/121.38 |

(Continued)

FOREIGN PATENT DOCUMENTS

| EP | 1797985 A1 * | 6/2007 | ............. B23K 37/06 |
| JP | 10-024370 A | 1/1998 | |

(Continued)

OTHER PUBLICATIONS

Machine translation of EP-1797985-A1, Jun. 2024 (Year: 2024).*

(Continued)

*Primary Examiner* — Geoffrey S Evans
(74) *Attorney, Agent, or Firm* — Oblon, McClelland, Maier & Neustadt, L.L.P.

(57) ABSTRACT

Provided is a crack repair method of melting and eliminating a crack generated in a steel material, the method including holding a tab plate in surface contact with the steel material in which the crack is generated, thereafter continuously irradiating the tab plate to a first end portion of the crack in the steel material with a laser beam, and subsequently continuously irradiating the crack with the laser beam along the crack to a second end portion of the crack to melt and eliminate the crack. Consequently, when eliminating the crack generated in a constituent member of an existing structure or a constituent member such as a machine component, the crack can be eliminated without forming a through hole in the constituent member.

12 Claims, 5 Drawing Sheets

(56) References Cited

U.S. PATENT DOCUMENTS

| | | | | |
|---|---|---|---|---|
| 2003/0217452 | A1* | 11/2003 | Talwar | B23K 20/1295 |
| | | | | 29/402.14 |
| 2009/0001065 | A1* | 1/2009 | Ladru | B23K 37/06 |
| | | | | 219/136 |
| 2010/0258540 | A1* | 10/2010 | Tamura | B23K 26/0604 |
| | | | | 219/121.64 |
| 2011/0247188 | A1 | 10/2011 | Van Rooyen et al. | |
| 2014/0197143 | A1 | 7/2014 | Burbaum et al. | |
| 2016/0151855 | A1* | 6/2016 | Fukuda | B23K 20/122 |
| | | | | 228/114.5 |

FOREIGN PATENT DOCUMENTS

| | | | |
|---|---|---|---|
| JP | 2000-35082 | A | 2/2000 |
| JP | 2001-287062 | A | 10/2001 |
| JP | 2003311463 | A * | 11/2003 |
| JP | 2004-141966 | A | 5/2004 |
| JP | 2010-023050 | A | 2/2010 |
| JP | 2012-512752 | A | 6/2012 |
| JP | 2013-86163 | A | 5/2013 |
| JP | 2015-024440 | A | 2/2015 |
| JP | 5860264 | B2 | 2/2016 |
| WO | WO 2009/051164 | A1 | 4/2009 |
| WO | WO 2013/093368 | A1 | 6/2013 |

OTHER PUBLICATIONS

Machine translation of JP-2003311463-A, Jun. 2024 (Year: 2024).*
Extended European Search Report issued Oct. 4, 2022, in corresponding European Patent Application No. 20747634.2, 7 pages.
International Search Report issued Apr. 7, 2020 in PCT/JP2020/003489 filed on Jan. 30, 2020, 2 pages.

* cited by examiner

CRACK REPAIR METHOD

TECHNICAL FIELD

Embodiments described herein relate to a crack repair method suitable for use in repairing a crack generated in a constituent member of an existing structure such as a bridge or a building, or a constituent member such as a machine component (each constituent member includes a welded part).

BACKGROUND ART

Heretofore, when a crack is generated in a steel material (a constituent member) of an existing structure such as a bridge or a building due to aging or metal fatigue, for example, a welding repair device in which a laser beam is used has been adopted. In the welding repair device in which a laser beam is used, a cracked portion to be repaired by welding is irradiated with the laser beam, and this portion to be repaired by welding is melted to eliminate the crack.

To repair this crack, when the steel material of the existing structure is irradiated with the laser beam to start welding, only the surface of the steel material is heated. Consequently, it is difficult to evenly melt the steel material in a thickness direction, and there is concern about a remaining crack or burn-through around the crack.

To solve the problem, in a conventional art, as described in Patent Document 1, a through hole is formed in one end portion of a crack generated in a steel material of an existing structure, and the crack is irradiated with a laser beam starting from the through hole, to prevent a temperature difference from being generated in the steel material in a thickness direction.

RELATED ART DOCUMENT

Patent Document
Patent Document 1: Japanese Patent No. 5860264

SUMMARY OF THE DISCLOSURE

Problems to be Solved by the Disclosure

In the above described conventional crack repair method, however, a diameter of a through hole formed in one end portion of a crack generated in a steel material (a constituent member) of an existing structure cannot be extremely smaller than a spot diameter of a laser beam (a spot diameter with which the crack can be securely eliminated; φ3 to 7 mm).

This is because when the diameter of the through hole is reduced, the residual stress may have an influence around the through hole in the steel material during build-up (hole filling) to the through hole after crack repair.

Therefore, in the above described conventional crack repair method, a through hole with a certain size needs to be formed in one end portion of a crack, also for repairing the crack. However, a problem is that the conventional crack repair method cannot be adopted for a constituent member of an existing structure in which formation of such a new through hole is not desirable, and to solve such a problem has been a challenge in the conventional art.

The present disclosure has been made to solve such a conventional problem as described above, and makes it possible to eliminate a crack without forming a through hole in a constituent member, when eliminating the crack generated in the constituent member of an existing structure or the constituent member, such as a machine component. As a result, an object of the present disclosure is to provide a crack repair method that can be adopted also for a constituent member in which formation of a new through hole is not desirable.

Means for Solving the Problems

In order to achieve the above object, an aspect of the present disclosure is directed to a crack repair method of melting and eliminating a crack generated in a constituent member (including a welded part), the method including holding a tab plate in surface contact with the constituent member in which the crack is generated, thereafter continuously irradiating the tab plate to a first end portion of the crack in the constituent member with a laser beam, and subsequently continuously irradiating the crack with the laser beam along the crack to a second end portion of the crack to melt and eliminate the crack.

In the crack repair method according to the present disclosure, in a case of repairing the crack generated in the constituent member, the tab plate held in surface contact with the constituent member is irradiated with the laser beam to start repair welding. Consequently, in the first end portion of the crack in the constituent member continuously irradiated with the laser beam from the tab plate, the constituent member is almost evenly molten in a thickness direction.

Then, the crack is continuously irradiated with the laser beam along the crack to the second end portion of the crack in this state, to perform the welding, so that the crack can be repaired without leaving the crack or burn-through around the crack.

Therefore, the crack can be eliminated without forming a through hole in the constituent member. As a result, the crack repair method according to the present disclosure can be adopted, for example, also for a constituent member of an existing structure in which formation of a new through hole is not desirable.

Effects of the Disclosure

According to a crack repair method of the present disclosure, a crack can be eliminated without forming a through hole in a constituent member, when eliminating the crack generated in the constituent member. Therefore, it is possible to bring a very excellent effect that the method can be adopted, for example, also for a constituent member of an existing structure in which formation of a new through hole is not desirable.

MODE FOR CARRYING OUT THE DISCLOSURE

Hereinafter, embodiments of the present disclosure will be described with reference to the drawings.

Figure 1:
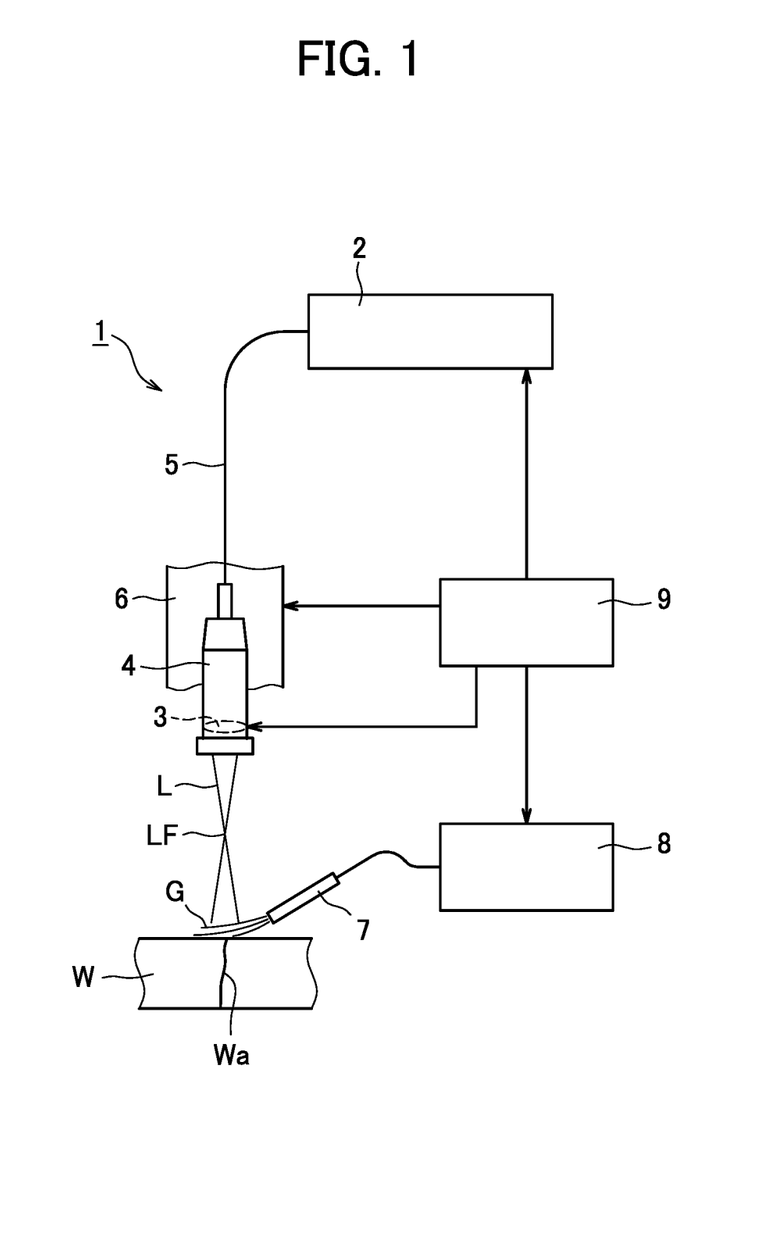
FIG. 1 is a schematic view schematically illustrating a repairing laser welding device for use in a crack repair method according to an embodiment of the present disclosure.

FIG. 1 shows a repairing laser welding device for use in a crack repair method according to an embodiment of the present disclosure.

As schematically shown in FIG. 1, a repairing laser welding device 1 melts and eliminates a crack Wa generated in a steel material (a constituent member) W of an existing structure. The repairing laser welding device 1 includes a laser oscillator 2, a laser head 4 that condenses a laser beam L supplied from the laser oscillator 2 with a built-in optical system 3 to irradiate, with the laser beam, a portion to be repaired in which the crack Wa is generated, an optical fiber 5 that guides the laser beam L from the laser oscillator 2 to the laser head 4, a drive section 6 that moves the laser head 4 along the portion to be repaired and close to and away from the portion to be repaired, and a gas supply source 8 that supplies, via a nozzle 7, a shield gas G to the portion to be repaired that is irradiated with the laser beam L.

Furthermore, the repairing laser welding device 1 includes a control section 9 that controls a spot diameter of the laser beam L emitted from the laser head 4, an operation of the laser head 4 by the drive section 6, gas supply from the gas supply source 8 or the like. The control section 9 controls the laser head 4 to locate a focus LF of the laser beam L outside the steel material W, and controls the laser head 4 so that a spot diameter φ of the laser beam L, with which the portion to be repaired where the crack Wa is generated is irradiated, is less than a predetermined size (e.g., less than 3 mm).

In this case, the control section 9 instructs the drive section 6 to move the laser head 4, thereby expanding a heat input region. That is, the heat input region generated by irradiating the steel material W with the laser beam L with the spot diameter φ less than 3 mm is expanded so as for the crack Wa to be located within this heat input region.

Figure 2:
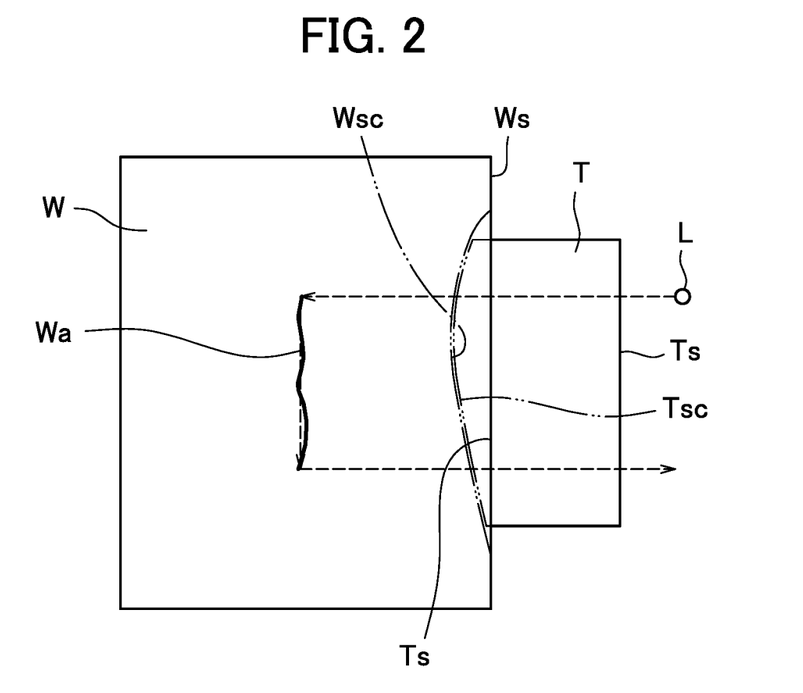
FIG. 2 is a planar explanatory view of a constituent member showing a laser beam path route in a case of performing crack repair with the repairing laser welding device of FIG. 1.

In this embodiment, when melting and eliminating the crack Wa generated in the steel material W, first, as shown in FIG. 2, a first (left in the drawing) side surface Ts of a tab plate T being the steel material is brought into surface contact with a side surface Ws of the steel material W in which the crack Wa is generated, and joined by welding, for example, spot welding. Note that when the tab plate T can be held by the steel material W by metal touching, the plate may be held by using an adhesive.

Next, irradiation with the laser beam L from the laser head 4 is started to input heat into a second (right in the drawing) side surface Ts of the tab plate T held in surface contact with the steel material W. In this case, output of the laser beam L is adjusted so that a shape coefficient (a penetration ratio) represented by dividing a penetration depth in a cross-sectional shape after welding operation by a thickness of the steel material W is from about 1.0 to 1.1. This adjustment is performed for formation of back beads (penetration operation) to avoid poor penetration.

Then, the drive section 6 moves the laser head 4 to continuously irradiate a first end portion (an upper end portion in the drawing) of the crack Wa in the steel material W with the laser beam L.

Subsequently, the drive section 6 moves the laser head 4 to continuously irradiate the crack Wa to a second end portion (a lower end portion in the drawing) of the crack Wa with the laser beam L, while supplying the shield gas G from the gas supply source 8 via the nozzle 7. The crack Wa is irradiated with the laser beam L, melted and eliminated.

Afterward, the drive section 6 moves the laser head 4 again to continuously irradiate the tab plate T with the laser beam L. Then, finally, the irradiation with the laser beam L is stopped and the tab plate T is removed from the steel material W. A path route of the laser beam L during this repair operation is shown by a broken line.

In the crack repair method according to this embodiment, in a case of repairing the crack Wa generated in the steel material W, repair welding is started by performing irradiation with the laser beam L to input heat into the second side surface Ts of the tab plate T held in surface contact with the steel material W. Therefore, in the first end portion of the crack Wa in the steel material W that is continuously irradiated with the laser beam L from the tab plate T, the steel material W is almost evenly molten in a thickness direction.

Therefore, when the crack Wa is continuously irradiated with the laser beam L to the second end portion thereof in this state, the crack Wa can be repaired without leaving the crack Wa or burn-through around the crack Wa.

Thus, the crack Wa can be eliminated without forming a through hole in the steel material W, and hence, the crack repair method according to this embodiment may be adopted also for a constituent member in which formation of a new through hole is not desirable.

This embodiment illustrates a case where each of the side surface Ws of the steel material W and the side surface Ts of the tab plate T that are joined in surface contact with each other by the spot welding is a flat surface, but this is not restrictive. For example, as shown by a virtual line in FIG. 2, each of a side surface Wsc of the steel material W and a side surface Tsc of the tab plate T may be a curved surface.

Further, in this embodiment, one tab plate T is joined to the steel material W, the crack Wa in the steel material W is irradiated to the second end portion thereof with the laser beam L to eliminate the crack Wa, and then the laser beam L is returned to the tab plate T. However, this is not restrictive, and a plurality of tab plates T may be provided to one crack Wa.

That is, after the irradiation with the laser beam L to eliminate the crack Wa, the laser beam L may be returned to the tab plate T that is different from the tab plate at the start of the irradiation with the laser beam L. In other words, the path route of the laser beam L may pass through the different tab plates T before and after the crack Wa is irradiated with the laser beam L.

For example, the tab plate T for starting the irradiation with the laser beam L is held at a position close to the first end portion of the crack Wa, and the tab plate T for stopping the irradiation with the laser beam L is held at a position close to the second end portion of the crack Wa. Then, the irradiation with the laser beam L (the heat input) may be started with the tab plate T for starting the irradiation, and the irradiation with the laser beam L may be stopped in the tab plate T for stopping the irradiation with the laser beam L.

That is, in place of the tab plate T in a form of FIG. 2, the tab plate T for starting the irradiation with the laser beam and the tab plate T for stopping the irradiation with the laser beam may be individually joined to the side surface Ws of the steel material W.

Figure 3:
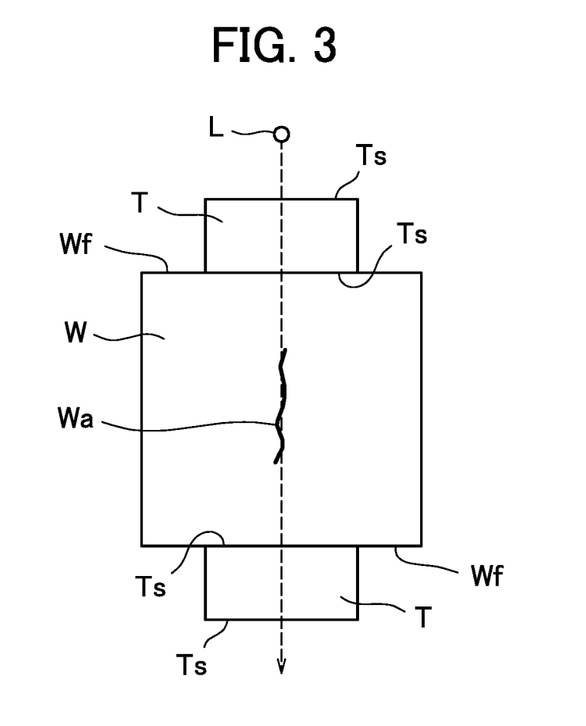
FIG. 3 is a planar explanatory view of the constituent member showing another path route of the laser beam in the case of performing the crack repair with the repairing laser welding device of FIG. 1.

Furthermore, as shown in FIG. 3, tab plates T may be joined to opposite end faces Wf, Wf of a steel material W in surface contact with the faces, respectively, and irradiation with a laser beam L starting from a side surface Ts of the tab plate T on a first side (an upper side in the drawing) may be ended in the tab plate T on a second side (a lower side in the drawing). A path route of the laser beam L during this repair operation is shown by a broken line.

In this embodiment, after irradiating the crack Wa to a second end portion thereof with the laser beam L, the irradiation with the laser beam L is continuously performed, and the laser beam L is returned to the tab plate T on the second side to end the irradiation. However, even when the irradiation with the laser beam L is stopped in the second end portion of the crack Wa, the crack Wa can be melted and eliminated. Therefore, the irradiation with the laser beam L may be stopped in the second end portion of the crack Wa without returning the laser beam L to the tab plate T on the second side.

Figure 4:
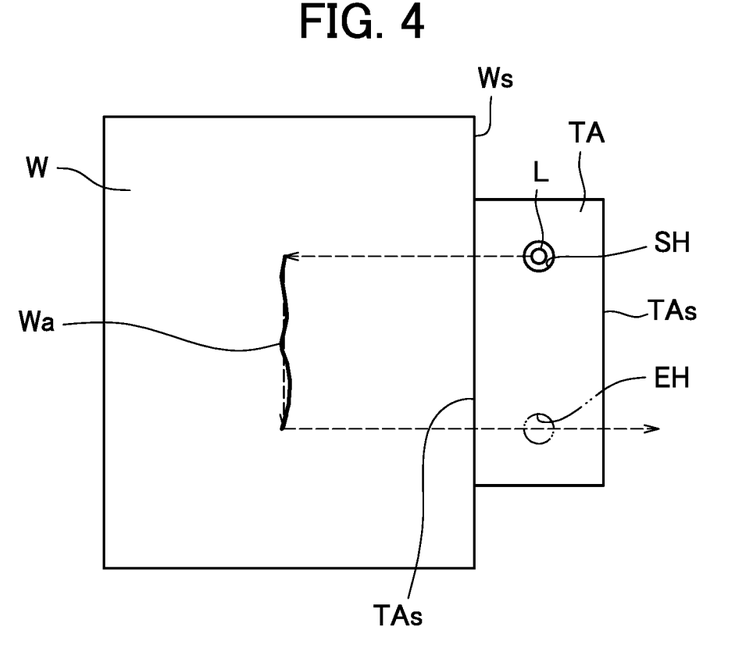
FIG. 4 is a planar explanatory view of a constituent member showing a laser beam path route in a case of performing crack repair by a crack repair method according to another embodiment of the present disclosure.

FIG. 4 shows a crack repair method according to another embodiment of the present disclosure.

As shown in FIG. 4, this crack repair method includes joining a first (left in the drawing) side surface TAs of a tab plate TA in which a through hole SH is formed to a side surface Ws of a steel material W in a surface contact state by spot welding. Then, irradiation with a laser beam L is started to input heat into an inner circumferential surface of the through hole SH of the tab plate TA. Note that the through hole SH extending through front and back of the tab plate TA is, for example, a round hole.

Also, in this crack repair method, for forming back beads to avoid poor penetration, output of the laser beam L is adjusted so that a shape coefficient (a penetration ratio) is from about 1.0 to 1.1.

Then, the laser beam L is continuously moved to a first end portion (an upper end portion in the drawing) of a crack Wa of the steel material W. Subsequently, the laser beam L is continuously moved along the crack Wa to a second end portion (a lower end portion in the drawing) of the crack Wa while supplying a shield gas G, and the crack Wa is irradiated with the laser beam L, melted and eliminated.

Afterward, the laser beam L is again continuously moved to the tab plate TA. Then, finally, the irradiation with the laser beam L is stopped and the tab plate TA is removed from the steel material W. A path route of the laser beam L during this repair operation is shown by a broken line.

The crack repair method according to this embodiment also includes irradiating, with the laser beam L, the through hole SH of the tab plate TA held in surface contact with the steel material W in which the crack Wa is generated, to start repair welding. Therefore, in the first end portion of the crack Wa of the steel material W that is continuously irradiated with the laser beam L from the through hole SH of the tab plate TA, the steel material W is almost evenly molten in a thickness direction. Then, when the crack Wa is continuously irradiated with the laser beam L to the second end portion thereof in this state, the crack Wa can be repaired without leaving the crack Wa or burn-through around the crack Wa.

In this embodiment, after the crack Wa of the steel material W is melted and eliminated, the irradiation with the laser beam L is stopped in a stage in which the laser beam L continuously moved to the tab plate TA is away from a second (right in the drawing) side surface TAs of the tab plate TA. However, this is not restrictive. As shown by a virtual line in FIG. 4, a through hole EH may be formed in the tab plate TA, to stop the irradiation with the laser beam L with the through hole EH. Alternatively, the laser beam L may be returned again to the through hole SH to stop the irradiation. Here, the through hole EH extending through front and back of the tab plate TA is, for example, a round hole.

Note that also, in respective embodiments described later (forms of FIG. 5, FIG. 6 and FIG. 7), a through hole may be provided in a tab plate, to perform irradiation start and irradiation stop with a laser beam L in this through hole. Alternatively, in place of the through hole, a recess such as a cutout may be formed in a side surface of the tab plate. Then, the irradiation with the laser beam L may be started to input heat into this recess. In this case, as a shape of the recess to be formed in the side surface of the tab plate, for example, a semicircular shape or a polygonal shape may be adopted.

Figure 5:
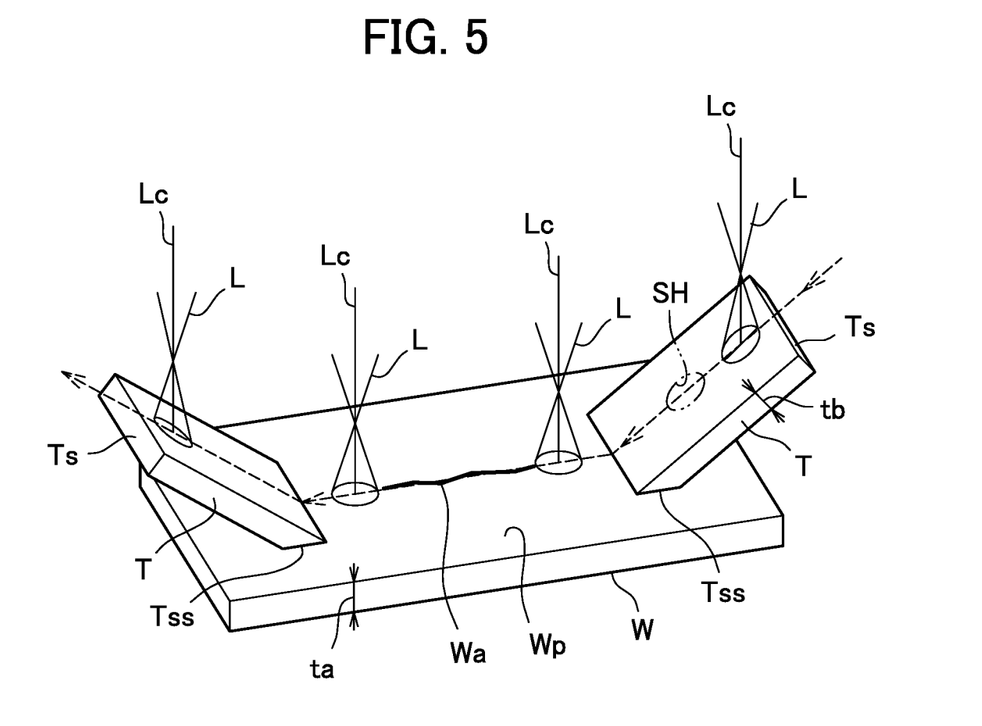
FIG. 5 is a perspective explanatory view of a constituent member showing a laser beam path route in a case of performing crack repair by a crack repair method according to still another embodiment of the present disclosure.

FIG. 5 shows a crack repair method according to still another embodiment of the present disclosure.

As shown in FIG. 5, this crack repair method includes arranging two tab plates T, T to sandwich a crack Wa therebetween on a surface Wp of a steel material W. Then, the method includes bringing a first diagonally cut side surface Tss of each of these tab plates T, T into surface contact with the surface Wp of the steel material W, and joining the side surfaces so that second side surfaces Ts, Ts are inclined away from each other, for example, by spot welding.

Next, irradiation with the laser beam L is started to input heat into the side surface Ts of the tab plate T on a first side (a right side in the drawing) inclined and held in surface contact with the surface Wp of the steel material W.

Here, an optical axis Lc of the laser beam L is set to be almost perpendicular to the surface Wp of the steel material W. That is, optical axes Lc of laser beams L are inclined to two tab plates T, T, respectively. However, unless an angle formed between the tab plate T and the optical axis L of the laser beam L is far from perpendicular, no problem occurs in operation.

Also, in this embodiment, output of the laser beam is adjusted so that a shape coefficient (a penetration ratio) represented by dividing a penetration depth in a cross-sectional shape after welding operation by a thickness to of the steel material W is from about 1.0 to 1.1. This is also adjustment for formation of back beads to avoid poor penetration. Also, in the tab plate T inclined and held in surface contact with the surface Wp of the steel material W, the output of the laser beam is adjusted in consideration of inclination and thickness tb of the plate so that the shape coefficient is from about 1.0 to 1.1.

Then, the laser beam L is continuously moved to a first end portion (a right end portion in the drawing) of the crack Wa in the steel material W. Subsequently, the laser beam L is continuously moved along the crack Wa to a second end portion (a left end portion in the drawing) of the crack Wa while supplying a shield gas G, and the crack Wa is irradiated with the laser beam L and melted.

Afterward, the laser beam L is continuously moved to the tab plate T on a second side (a left side in the drawing) inclined and held in surface contact with the surface Wp of the steel material W. Then, finally, the irradiation with the laser beam L is stopped and each of the tab plates T, T is removed from the steel material W. A path route of the laser beam L during this repair operation is shown by a broken line.

In a case of repairing the crack Wa generated in the steel material W by the crack repair method according to this embodiment, the tab plate T inclined and held in surface contact with the surface Wp of the steel material W is irradiated with the laser beam L, to start repair welding. Consequently, in the first end portion of the crack Wa in the steel material W that is continuously irradiated with the laser beam L from the tab plate T, the steel material W is almost evenly molten in a thickness direction.

Therefore, when the crack is continuously irradiated with the laser beam L along the crack Wa to the second end portion thereof in this state, the crack Wa can be repaired without leaving the crack Wa or burn-through around the crack Wa.

Thus, the crack Wa can be eliminated without forming a through hole in the steel material W, and hence, the crack repair method according to this embodiment can be adopted also for a constituent member in which formation of a new through hole is not desirable.

Furthermore, the crack repair method according to this embodiment includes arranging the two tab plates T, T at positions in vicinities of the crack Wa of the steel material W, and joining the first diagonally cut side surface Tss of each of these tab plates T, T in surface contact with the surface Wp of the steel material W. As a result, in a case where the crack Wa is generated at a position distant from the side surface or end face of the steel material W, a moving distance of the laser beam L can be minimized. That is, shortening of a repair operation time and reduction of repair operation cost can be achieved.

Figure 6:
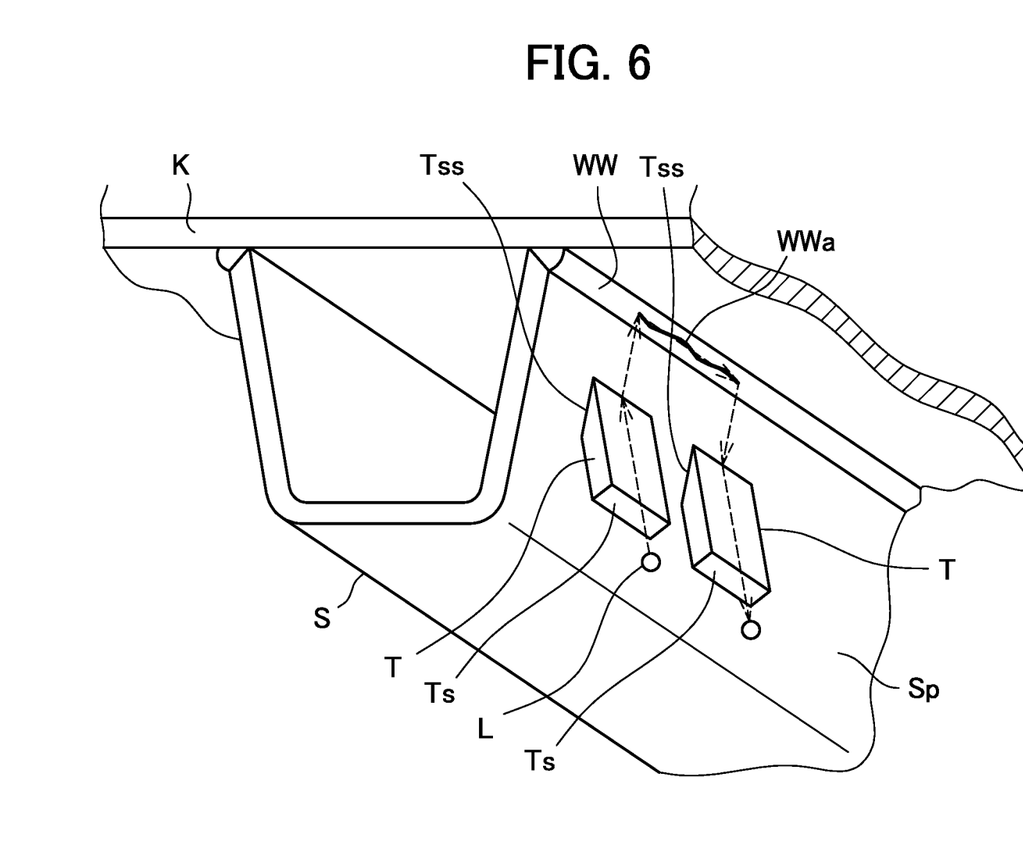
FIG. 6 is a perspective explanatory view of a steel plate deck showing a laser beam path route in a case of repairing a crack generated in a welded part of the steel plate deck by the crack repair method of FIG. 5.

The crack repair method according to the above described embodiment from which such an effect can be obtained can be applied to, for example, repair of a crack WWa generated along an entire length of a welded part (a constituent member) WW formed between a steel plate K forming a steel plate deck and a stiffener S disposed on a downward surface of the steel plate K by arc welding as shown in FIG. 6.

That is, in this application example, two tab plates T, T are arranged in parallel with each other on a surface Sp of the stiffener S connected to the welded part WW. Then, each of first diagonally cut side surfaces Tss, Tss of these tab plates T, T are oriented to the crack WWa in the welded part WW, brought into surface contact with the surface Sp of the stiffener S, and joined to the surface, for example, by spot welding.

Next, irradiation with a laser beam L is started to input heat into a second side surface Ts of a first-side (left-side in the drawing) tab plate T inclined and held in surface contact with the surface Sp of the stiffener S.

Then, the laser beam L is continuously moved to a first end portion (a left end portion in the drawing) of the crack WWa in the welded part WW. Subsequently, the laser beam L is continuously moved along the crack WWa to a second end portion (a right end portion in the drawing) of the crack WWa, and the crack WWa is irradiated with the laser beam L and melted.

Afterward, the laser beam L is continuously moved to a second-side (right-side in the drawing) tab plate T inclined and held in surface contact with the surface Sp of the stiffener S. Then, finally, the irradiation with the laser beam L is stopped and each of the tab plates T, T is removed from the stiffener S. A path route of the laser beam L during this repair operation is shown by a broken line.

Also, in the crack repair method according to this application example, in a case of repairing the crack WWa generated in the welded part WW, the tab plate T inclined and held in surface contact with the surface Sp of the stiffener S is irradiated with the laser beam L to start repair welding. Therefore, in the first end portion of the crack WWa in the welded part WW that is continuously irradiated with the laser beam L from the tab plate T, the welded part WW is molten almost evenly in a thickness direction.

Therefore, when the crack WWa is continuously irradiated with the laser beam L along the crack to the second end portion thereof in this state, the crack WWa can be repaired without leaving the crack WWa or burn-through around the crack WWa. Thus, the crack repair method according to this embodiment may be adopted also for the stiffener S or the welded part WW of the steel plate deck in which formation of a new through hole is not desirable.

The above described application example illustrates the case of repairing the crack WWa generated in the welded part WW between the steel plate K and the stiffener S, but this is not restrictive. The above embodiment may be applied to repair of a crack WWa generated in a region other than the welded part WW in the steel plate deck, as another application example. For example, the above embodiment may be applied, for example, to repair of a crack or the like generated around the welded part WW. Alternatively, the above embodiment may be applied to repair or the like of a crack generated in the steel plate K or the stiffener S.

Furthermore, the above described embodiment illustrates the case of repairing the crack WWa generated in the welded part WW between the steel plate K and the stiffener S, but this is not restrictive. The above embodiment may be applied to repair of a crack generated in a welded part in a structure other than the steel plate deck or a crack generated around the welded part, as another embodiment. Alternatively, the above embodiment may be applied to repair of a crack generated in a portion in which members are joined to each other to form an angle, for example, between the steel plate K and the stiffener S, that is, a crack generated in a recess, a corner or the like of the structure.

In a case where it is difficult to hold the tab plate in a vicinity of the crack, the tab plate is held in a region where the tab plate is easily held, and start of irradiation and stop of irradiation with the laser beam may be performed with this tab plate.

Additionally, the crack repair method according to this embodiment may be applied to a case where an outer shape of a constituent member (an object to be repaired) is a curved surface, that is, repair of a crack generated in a curved surface. For example, the embodiment may be applied to repair of a crack generated in a member forming a rotating machine. An example of the constituent member is a rotating body such as a fan or an impeller.

Figure 7:
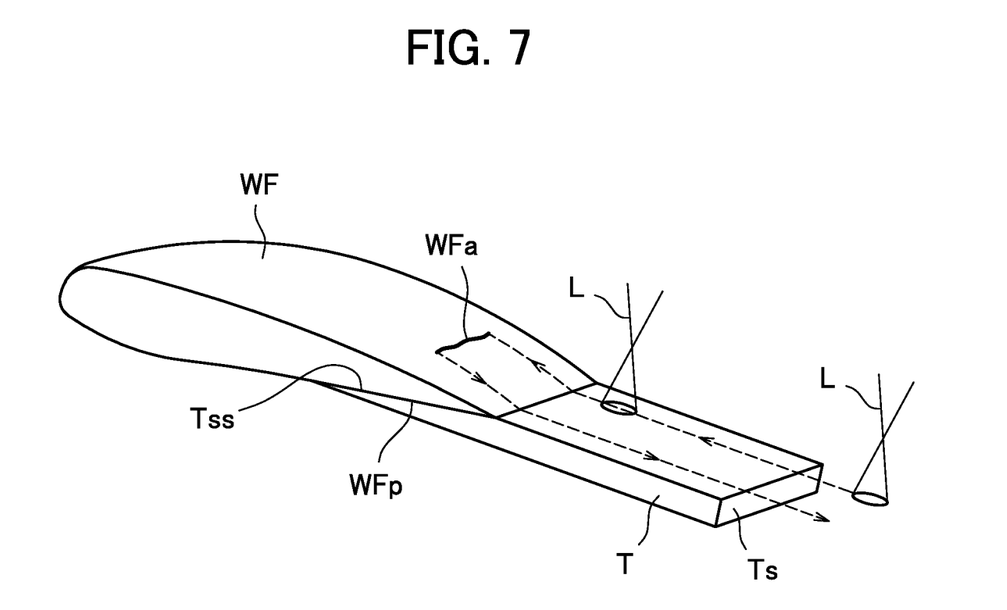
FIG. 7 is a perspective explanatory view of a blade showing a laser beam path route in a case of repairing a crack generated in the blade of a rotating machine by the crack repair method of FIG. 5.

For example, the embodiment may be applied to repair of a crack WFa generated in a blade WF of the rotating machine as shown in FIG. 7.

That is, in this application example, a tab plate T is disposed on a back surface WFp of the blade WF. Then, a first diagonally cut side surface Tss of the tab plate T located in a vicinity of the crack WFa in the blade WF is brought into surface contact with and joined to the back surface WFp of the blade WF, for example, by spot welding.

Next, irradiation with a laser beam L is started to input heat into a second side surface Ts of the tab plate T held in surface contact with the back surface WFp of the blade WF.

Then, the laser beam L is continuously moved to a first end portion (a right end portion in the drawing) of the crack WFa in the blade WF. Subsequently, the laser beam L is continuously moved along the crack WWa to a second end portion (a left end portion in the drawing) of the crack WFa, and the crack WFa is irradiated with the laser beam L and melted.

Afterward, the laser beam L is continuously moved and returned to the tab plate T held in surface contact with the back surface WFp of the blade WF. Then, finally, the irradiation with the laser beam L is stopped and the tab plate T is removed from the blade WF. A path route of the laser beam L during this repair operation is shown by a broken line.

Also, in the crack repair method according to this application example, in a case of repairing the crack WFa generated in the blade WF, the tab plate T held in surface contact with the back surface WFp of the blade WF is irradiated with the laser beam L to start repair welding. Therefore, in the first end portion of the crack WFa in the blade WF that is continuously irradiated with the laser beam L from the tab plate T, the blade WF is molten almost evenly in a thickness direction.

Therefore, when the crack WFa is continuously irradiated with the laser beam L along the crack to the second end portion thereof in this state, the crack WFa can be repaired without leaving the crack WFa or burn-through around the crack WFa. Thus, the crack repair method according to this embodiment may be adopted also for the blade WF in which formation of a new through hole is not desirable.

The repair method of each of the above described embodiments may be applied to repair of a crack generated in a steel material of an existing structure such as a bridge, a building or a built structure. Alternatively, the method may be applied to repair of a crack generated in a welded part of the existing structure. In the bridge, the method may be applied to repair of a crack generated in a member such as a steel plate deck, a main girder or a web plate forming the bridge.

In each of the above described embodiments, in a case where the constituent member (the object to be repaired) is a steel structure such as a steel member forming the bridge, a plate thickness of the steel material may be from 3.2 to 30 mm. For example, the plate thickness may be 6 mm or more, or 12 mm. Furthermore, the steel material may be a steel material such as carbon steel (SS, SM), high-strength carbon steel (HT690, HT780, HT980), or stainless steel (SUS).

In each of the above described embodiments, a material of the constituent member (the object to be repaired) may be heat resistant steel, low temperature steel or the like, or may be a metal material such as an alloy other than iron and steel. Then, in a case where the constituent member is a member forming the rotating machine, a material of the member may be nickel alloy, titanium alloy, Cr—Mo steel or heat resistant steel.

A configuration of the crack repair method according to the present disclosure is not limited to the above described embodiments, and can be variously modified without departing from scope of the disclosure. For example, the crack repair method according to the present disclosure may be for use in repairing a crack generated in a constituent member such as a machine component.

A first aspect of the present disclosure is a crack repair method of melting and eliminating a crack generated in a constituent member (including a welded part), the method including holding a tab plate in surface contact with the constituent member in which the crack is generated, thereafter continuously irradiating the tab plate to a first end portion of the crack in the constituent member with a laser beam, and subsequently continuously irradiating the crack with the laser beam along the crack to a second end portion of the crack to melt and eliminate the crack.

In the crack repair method of the present disclosure, as laser, fiber laser, YAG laser or semiconductor laser is conventionally used, but such laser is not restrictive.

In the crack repair method of the present disclosure, for holding the tab plate in surface contact with the constituent member, for example, spot welding may be adopted. However, when the tab plate can be held by the constituent member by metal touching, the plate may be held by using an adhesive.

In the crack repair method according to the first aspect of the present disclosure, in a case of repairing the crack generated in the constituent member, the tab plate held in surface contact with the constituent member is irradiated with the laser beam to start repair welding. Consequently, in the first end portion of the crack in the constituent member continuously irradiated with the laser beam from this tab plate, the constituent member is almost evenly molten in a thickness direction.

Then, the crack is continuously irradiated with the laser beam along the crack to the second end portion of the crack in this state, to perform the welding, so that the crack can be repaired without leaving the crack or burn-through around the crack.

Therefore, the crack can be eliminated without forming a through hole in the constituent member. As a result, the crack repair method according to the present disclosure can be adopted, for example, also for a constituent member of an existing structure in which formation of a new through hole is not desirable.

Furthermore, a second aspect of the present disclosure includes holding the tab plate in surface contact with either one of a front surface and a back surface of the constituent member in which the crack is generated, and thereafter continuously irradiating the tab plate to the second end portion of the crack in the constituent member with the laser beam to melt and eliminate the crack.

In the crack repair method according to the second aspect of the present disclosure, for example, in a case where the crack is generated at a position distant from the side surface or end face of the constituent member, the tab plate is disposed at a position in a vicinity of the crack in the constituent member, and this tab plate is brought in surface contact with and joined to one of the front and back surfaces of the constituent member. Consequently, a moving distance of the laser beam can be minimized, and shortening of a repair operation time and reduction of repair operation cost can be achieved.

Furthermore, a third aspect of the present disclosure includes starting irradiation with a laser beam to input heat into a side surface of the tab plate. In this case, a recess such as a cutout may be formed in the side surface of the tab plate, and the irradiation with the laser beam may be started to input heat into the recess.

In the crack repair method according to the third aspect of the present disclosure, since the irradiation with the laser beam is started from the side surface of the tab plate, formation of back beads can be confirmed.

Additionally, a fourth aspect of the present disclosure includes forming a through hole in the tab plate, and starting irradiation with a laser beam to input heat into an inner circumferential surface of the through hole.

Also, in the crack repair method according to the fourth aspect of the present disclosure, since the irradiation with the laser beam is started from the inner circumferential surface of the through hole in the tab plate, the formation of the back beads can be confirmed.

Furthermore, a fifth aspect of the present disclosure includes continuously irradiating the tab plate or, separately from the tab plate, a tab plate held in surface contact with the constituent member with a laser beam.

In the crack repair method according to the fifth aspect of the present disclosure, the moving distance of the laser beam can be minimized, and the shortening of the repair operation time and the reduction of the repair operation cost can be achieved.

EXPLANATION OF REFERENCE SIGNS

L laser beam
S stiffener forming a steel plate deck
Sp surface of the stiffener
SH, EH through hole in a tab plate
T, TA tab plate
Ts, TAs side surface of the tab plate
Tsc curved side surface of the tab plate
Tss diagonally cut side surface of the tab plate
W steel material (a constituent member)
WF blade (a constituent member)
WFp back surface of the blade
WW welded part (a constituent member)
Wa, WFa, WWa crack
Wf end face of the steel material
Wp surface of the steel material
Ws side surface of the steel material
Wsc curved side surface of the steel material

The invention claimed is:

1. A crack repair method of melting and eliminating a crack generated in a constituent member, comprising:
    holding a tab plate in surface contact with the constituent member in which the crack is generated,
    thereafter irradiating the tab plate with a laser beam to start repair welding, and
    continuously irradiating the tab plate to a first end portion of the crack in the constituent member with the laser beam, and subsequently continuously irradiating the crack with the laser beam along the crack to a second end portion of the crack to melt and eliminate the crack.

2. The crack repair method according to claim 1, further comprising:
    holding the tab plate in surface contact with either one of a front surface and a back surface of the constituent member in which the crack is generated, and
    thereafter continuously irradiating the tab plate to the second end portion of the crack in the constituent member with the laser beam to melt and eliminate the crack.

3. The crack repair method according to claim 2, further comprising:
    starting irradiation with a laser beam to input heat into a side surface of the tab plate.

4. The crack repair method according to claim 3, further comprising:
    continuously irradiating the tab plate or, separately from the tab plate, a tab plate held in surface contact with the constituent member with a laser beam.

5. The crack repair method according to claim 2, further comprising:
    forming a through hole in the tab plate, and starting irradiation with a laser beam to input heat into an inner circumferential surface of the through hole.

6. The crack repair method according to claim 5, further comprising:
    continuously irradiating the tab plate or, separately from the tab plate, a tab plate held in surface contact with the constituent member with a laser beam.

7. The crack repair method according to claim 2, further comprising:
    continuously irradiating the tab plate or, separately from the tab plate, a tab plate held in surface contact with the constituent member with a laser beam.

8. The crack repair method according to claim 1, further comprising:
    starting irradiation with a laser beam to input beat into a side surface of the tab plate.

9. The crack repair method according to claim 8, further comprising:
    continuously irradiating the tab plate or, separately from the tab plate, a tab plate held in surface contact with the constituent member with a laser beam.

10. The crack repair method according to claim 1, further comprising:
    forming a through hole in the tab plate, and starting irradiation with a laser beam to input beat into an inner circumferential surface of the through hole.

11. The crack repair method according to claim 8, further comprising:
    continuously irradiating the tab plate or, separately from the tab plate, a tab plate held in surface contact with the constituent member with a laser beam.

12. The crack repair method according to claim 1, further comprising:
    continuously irradiating the tab plate or, separately from the tab plate, a tab plate held in surface contact with the constituent member with a laser beam.

* * * * *